(12) United States Patent
Kato et al.

(10) Patent No.: US 10,274,680 B2
(45) Date of Patent: Apr. 30, 2019

(54) DELAY LINE INTERFEROMETER WITH POLARIZATION COMPENSATION AT SELECTIVE FREQUENCY

(71) Applicant: INPHI CORPORATION, Santa Clara, CA (US)

(72) Inventors: Masaki Kato, Palo Alto, CA (US); Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 16/015,854

(22) Filed: Jun. 22, 2018

(65) Prior Publication Data
US 2018/0299620 A1    Oct. 18, 2018

Related U.S. Application Data (63) Continuation of application No. 15/088,862, filed on Apr. 1, 2016, now Pat. No. 10,031,289.

(51) Int. Cl.
| | |
|---|---|
| G02B 6/27 | (2006.01) |
| G02B 6/12 | (2006.01) |
| G02B 6/293 | (2006.01) |
| G02B 6/125 | (2006.01) |
| G02B 6/122 | (2006.01) |
| G02B 6/126 | (2006.01) |

(52) U.S. Cl.
CPC ............ *G02B 6/274* (2013.01); *G02B 6/125* (2013.01); *G02B 6/29352* (2013.01); *G02B 6/29395* (2013.01); *G02B 6/126* (2013.01); *G02B 6/1228* (2013.01); *G02B 6/2793* (2013.01)

(58) Field of Classification Search
None
See application file for complete search history.

(56) References Cited

U.S. PATENT DOCUMENTS 10,031,289 B2 *  7/2018  Kato ................... G02B 6/274

* cited by examiner

*Primary Examiner* — Michael Stahl
(74) *Attorney, Agent, or Firm* — Richard T. Ogawa; Ogawa P.C.

(57) ABSTRACT

An apparatus of polarization self-compensated delay line interferometer. The apparatus includes a first waveguide arm of a first material of a first length disposed between an input coupler and an output coupler and a second waveguide arm of the first material of a second length different from the first length disposed between the same input coupler and the same output coupler. The apparatus produces an interference spectrum with multiple periodic passband peaks where certain TE (transverse electric) and TM (transverse magnetic) polarization mode passband peaks are lined up. The apparatus further includes a section of waveguide of a birefringence material of a third length added to the second waveguide arm to induce a phase shift of the lined-up TE/TM passband peaks to a designated grid as corresponding polarization compensated channels of a wide optical band.

20 Claims, 5 Drawing Sheets

| Lb = 36um | Lb = 39um | Lb = 42um | Lb = 45um |
|---|---|---|---|
| Lb = 24um | Lb = 27um | Lb = 30um | Lb = 33um |
| Lb = 12um | Lb = 15um | Lb = 18um | Lb = 21um |
| Lb = 0um | Lb = 3um | Lb = 6um | Lb = 9um |

DELAY LINE INTERFEROMETER WITH POLARIZATION COMPENSATION AT SELECTIVE FREQUENCY

CROSS-REFERENCE TO RELATED APPLICATIONS

This application is continuation of and claims priority to U.S. patent application Ser. No. 15/088,862, filed on Apr. 1, 2016, commonly assigned and incorporated by reference herein for all purposes.

BACKGROUND OF THE INVENTION

The present invention relates to optical communication techniques, more particularly, the present invention provides a delay line interferometer based on silicon photonics waveguides with polarization compensation at selective frequencies.

Over the last few decades, the use of communication networks has exploded. In the early days Internet, popular applications were limited to emails, bulletin board, and mostly informational and text-based web page surfing, and the amount of data transferred was relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

40-Gbit/s and then 100-Gbit/s data rate dense-wavelength-division multiplexing (DWDM) optical transmission over existing single-mode fiber is a developing target for the next generation of fiber-optic communication networks. The big hang up so far has been the fiber impairments like chromatic dispersion that are slowing the communication signal down. Everything is okay up to 10 Gbits/s for distances less than 100 km and at 1300 nm transmission wavelength, but beyond that, distortion and attenuation take their toll. Many approaches are proposed on modulation methods for transmitting two or more bits per symbol so that higher communication rates can be achieved. Mach-Zehnder modulators can handle the higher data rates but require a driver that is differential with a wide output voltage swing. Beyond the light modulation for data transmission, the optical multiplexer (MUX) and de-multiplexer (DEMUX) of light signals is an essential building block for the optical network based on silicon photonics.

Silicon photonic devices can be made using existing semiconductor fabrication techniques, and because silicon-on-insulator is already used as the substrate for most integrated circuits, it is possible to create hybrid devices in which the optical and electronic components are integrated onto a single microchip. In particular, silicon photonic devices have been applied in WDM, e.g., CWDM or particularly DWDM, optical transmission networks, in which MUX/DEMUX wavelengths may be changed by environment temperature to cause problems to optical signals transmitted through the networks. A delay line interferometer (DLI) based on silicon photonics waveguides can be an important 2-channel MUX/DEMUX device with very low loss based on time-delayed two-beam interference in its two waveguide arms. However, for most given DLI device with two arms of a same material having a length difference $\Delta L$, the group indices for TE and TM mode polarized light waves may be different due to birefringence effect of the waveguide material, causing different free spectral ranges for the TE mode and TM mode and resulting misaligned TE and TM passbands. Therefore, it is desired to develop silicon photonics based delay line interferometer with polarization compensation at selective passband wavelengths for WDM applications.

BRIEF SUMMARY OF THE INVENTION

The present invention relates to optical communication techniques. More particularly, the present invention provides a delay line interferometer (DLI) based on silicon photonics waveguides with polarization compensation at selective frequencies. Merely by example, the present invention discloses a DLI device with one or more polarization compensated passband wavelengths by adding a proper length of birefringence waveguide material and provides a method for manufacturing the DLI device with the polarization compensated wavelength channels covering entire C-band for high speed DWDM optical communications, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides an apparatus of polarization self-compensated delay line interferometer. The apparatus includes a first waveguide arm disposed between an input coupler and an output coupler. Additionally, the apparatus includes a second waveguide arm disposed between the input coupler and the output coupler. The second waveguide arm is at least different from the first waveguide arm by a first length to induce an interference output spectrum having one or more passband peaks lined up for TE (transverse electric) polarization mode and TM (transverse magnetic) polarization mode at one or more channel frequencies of a designated optical band. Moreover, the apparatus includes a birefringence waveguide section of a second length inserted in the second waveguide arm to induce a phase shift of the one or more passband peaks lined up for TE mode and TM mode at one or more alternative channel frequencies of the designated optical band. The second length is selected from a fixed set of values stepwisely increased from zero to a maximum value with a predetermined increment.

In an alternative embodiment, the present invention provides a method for forming a set of polarization self-compensated delay line interferometers. The method includes providing a first delay line interferometer. The first delay line interferometer includes a first waveguide arm of a first length disposed between an input coupler and an output coupler and a second waveguide arm of a second length disposed between the input coupler and the output coupler. The second length is at least different from the first length to induce an interference output spectrum having one or more passband peaks lined up for TE (transverse electric) polarization mode and TM (transverse magnetic) polarization mode at one or more channel frequencies of a designated optical band. The method further includes selecting a birefringence phase shifter of a third length. The third length is assigned a value from a fixed set of values stepwise increased from a first non-zero value up to a maximum value with a predetermined increment. Moreover, the method includes forming a set of delay line interferometers by respectively adding a set of the birefringence phase shifters of various assigned values in the third length to the second waveguide arm of the first delay line interferometer.

The present invention achieves these benefits and others in the context of known waveguide laser modulation technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to optical communication techniques. More particularly, the present invention provides a delay line interferometer (DLI) based on silicon photonics waveguides with polarization compensation at selective frequencies. Merely by example, the present invention discloses a DLI device with one or more polarization compensated passband wavelengths by adding a proper length of birefringence waveguide material and provides a method for manufacturing the DLI device with the polarization compensated wavelength channels covering entire C-band for high speed DWDM optical communications, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1A:
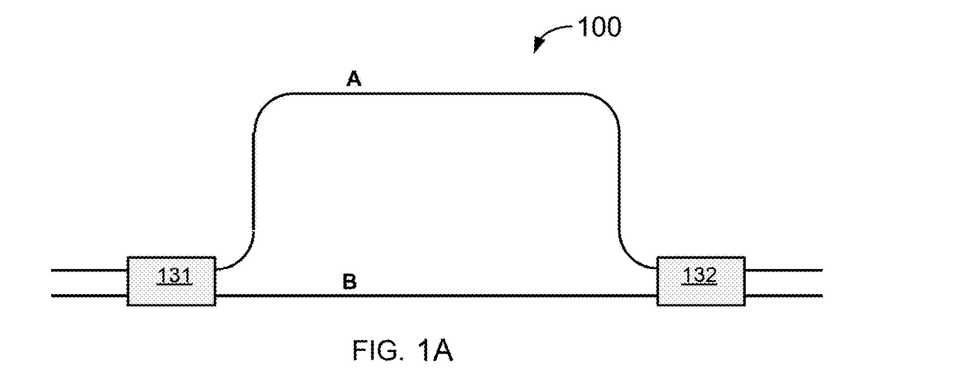
FIGS. 1A and 1B are a schematic diagram of a regular delay line interferometer (DLI) device and corresponding DLI passbands with different TE-TM polarization offsets.
Figure 1B:
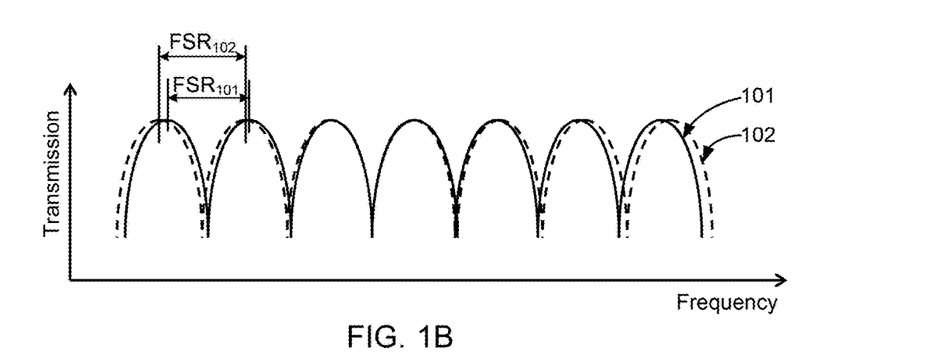

FIGS. 1A and 1B are a schematic diagram of a regular delay line interferometer (DLI) device and corresponding DLI passbands with different TE-TM polarization offsets. As shown in FIG. 1A, a delay line interferometer (DLI) device 100 is schematically depicted as two waveguide arms A and B disposed between two Multimode Interference (MMI) couplers 131 and 132. The two waveguide arms A and B have at least a length difference $\Delta L$ or possibly made by different materials with respective group indices of $N_A$ and $N_B$. Correspondingly, a time-delay difference for two light waves respectively traveling through the two waveguide arms of the DLI device is equal to an inverse free spectral range (FSR):

$$\frac{L_A}{(c/N_A)} - \frac{L_B}{(c/N_B)} = \frac{1}{FSR} \quad (1)$$

where c is speed of light. Eq. (1) suggests that an interference spectrum of the DLI device is a periodic multi-maxima passbands across a wide spectral band where the spacing between two nearest peak frequencies is defined as the FSR (i.e., the period of the interference spectrum). On the other hand, as shown in FIG. 1B, most waveguide material has birefringence effect so that the group index for TE polarization mode is different from the group index for TM polarization mode, resulting in different FSR values for TE polarization mode and TM polarization mode. This causes a varied offset between TE mode passbands 101 and corresponding TM mode passbands 102 at different frequencies.

For example, for a pair of waveguide arms A and B both made by silicon nitride material (which is a birefringence material with respective group indices of for TE mode $N_{TE}$~1.97 and for TM mode $N_{TM}$~1.89) with a length difference of $\Delta L$~1555 μm gives $FSR_{101}$ of ~98 GHz for TE mode passbands 101 and $FSR_{102}$ of ~102 GHz for TM mode passbands 102. The 4 GHz offset in FSR leads to most peak frequencies for TE mode and TM mode are off the mutual lineup except one or two passband peaks in entire spectral band. By changing at least the length difference $\Delta L$, TE mode passband can be lined up with TM mode passband at one or more different frequencies.

In another example, both the waveguide arm A and arm B are mode by silicon material which has a polarization dependent index change about 2× more temperature-sensitive than silicon nitride material. Alternatively, waveguide arm A and arm B can be made by different material. Optionally, arm A is made by silicon nitride and arm B is made by silicon, or vise versa. Optionally, the waveguide arm A and arm B can be made by silicon nitride mixed with silicon oxide (SiON), in which the weight percentage of silicon oxide can be varied from 0% to 99% to produce varied polarization dependent group index for different applications.

In general, each passband peak for the DLI device 100 can be set to a channel of dense wavelength-division multiplexing (DWDM) ITU grid in a wide spectral band, e.g., C-band (wavelength range 1531 nm to 1570 nm). For DWDM applications with ITU grid, the FSR of the DLI device is configured to be twice of the channel spacing that is typically 100 GHz, or 50 GHz, or 25 GHz, or 12.5 GHz, or alternatively go extremely small as 5 GHz or even 2.5 GHz. For coarse wavelength-division multiplexing (CWDM) application, the channel spacing can be 200 GHz or higher. The free spectral spacing FSR defined above is equal to twice of channel spacing between two nearest channels in the designated frequency grid (e.g., 50 GHz ITU grid in DWDM or 200 GHz grid in CWDM in entire C-band). In order to ensure a particular channel in the C-band to be TE/TM polarization compensated, the length difference between the two birefringence waveguide arms must be properly selected to line up the TE mode passband peak with corresponding TM mode passband peak at the particular channel frequency.

Figure 2:
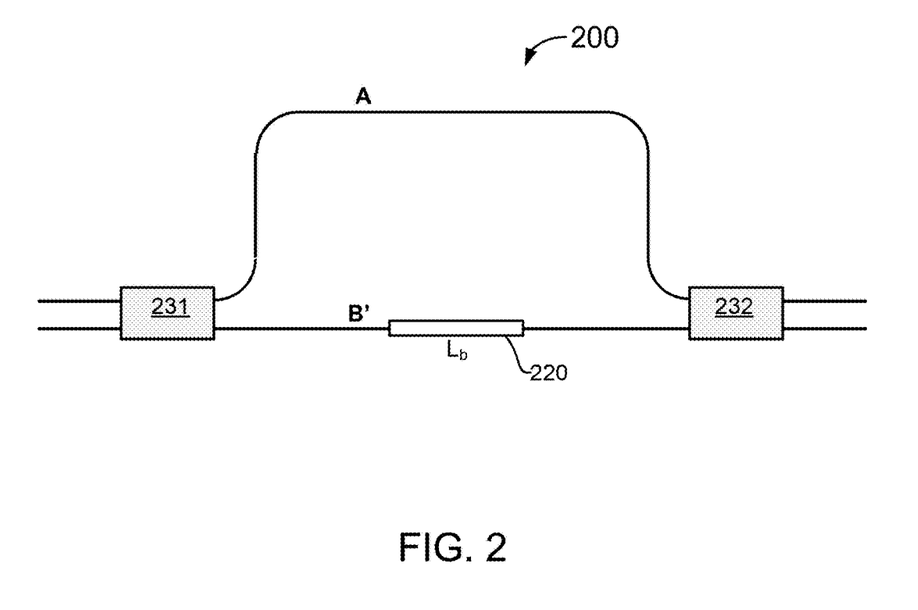
FIG. 2 is a schematic diagram of a polarization compensated DLI device based on an added length of a birefringence waveguide according to an embodiment of the present invention.

FIG. 2 is a schematic diagram of a polarization compensated DLI device based on an added length of a birefringence waveguide according to an embodiment of the present invention. This diagram is merely an example, which should not unduly limit the scope of the claims. One of ordinary skill in the art would recognize many variations, alternatives, and modifications. As shown, a length $L_b$ of a birefringence waveguide 220 is added to form a waveguide arm B' of the DLI device 200. The added length $L_b$ contributes an additional phase offset between TE polarization mode and TM polarization mode in the passbands of the DLI device 200 so that the line-up TE/TM passband peak frequency is shifted to a different value in the wide spectral band, e.g., a C-band.

In an embodiment, the added birefringence waveguide 220 in the arm B' of DLI device 200 is substantially made by the same birefringence material of original arm B of DLI device 100. In another embodiment, the added birefringence waveguide 220 is a planar waveguide section having a same height as the arm B' of the DLI device 200, herein the added length of the birefringence waveguide 220 alone contributes the phase offset change for shifting the line-up TE/TM passband peak frequency. In another embodiment, the added birefringence waveguide 220 in the arm B' of the DLI device 200 has a different width compared to original waveguide section and coupled to each other by a width adaptive taper (not explicitly shown). In certain embodiment, the different width of the added birefringence waveguide 220 also contributes the phase offset change for shifting the line-up TE-TM passband peak frequency, though the width contribution to the phase shift mostly is less effective and harder to control compared to the length contribution. In yet still another embodiment, the added birefringence waveguide 220 in the arm B' of the DLI device 200 is made by a different birefringence material comparing to that of original waveguide arm B of DLI device 100.

Figure 3:
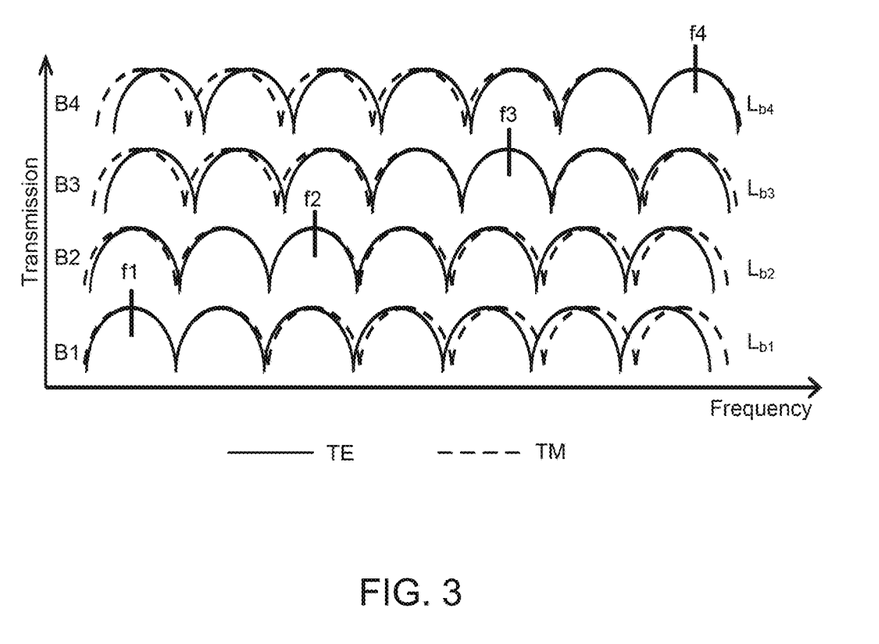
FIG. 3 is a simplified diagram showing a DLI passband with a lined-up TE-TM peak frequency shifted with additional length of birefringence waveguide in one arm according to an embodiment of the present invention.

FIG. 3 is a simplified diagram showing a DLI passband with a line-up TE-TM peak frequency shifted with additional length of birefringence waveguide in one arm according to an embodiment of the present invention. This diagram is merely an example, which should not unduly limit the scope of the claims. One of ordinary skill in the art would recognize many variations, alternatives, and modifications. As shown, an interference spectrum B1 of a first DLI device is associated with a lined-up TE/TM passband peak frequency f1 corresponding to an added length $L_{b1}$ of birefringence waveguide in one arm of the first DLI device. Referring to FIG. 2, a simplified illustration of one waveguide arm with added length of birefringence waveguide is provided. Additionally, for a second DLI device, a length of $L_{b2}$ of birefringence waveguide is added so that the phase offset of TE/TM mode is changed to cause the TE/TM passband peak frequency to line up at frequency f2 in the interference spectrum B2. Further, a third DLI device corresponds to a lined-up TE/TM passband peak frequency f3 in the interference spectrum B3 due to an added length $L_{b3}$ of birefringence waveguide and a fourth DLI device corresponds to a lined-up TE/TM passband peak frequency f4 in the interference spectrum B4 due to an added length $L_{b4}$ of birefringence waveguide. FIG. 3 merely shows several examples of lined-up passband peak frequencies f1, f2, f3, and f4, shifting from one to another by about 2×FSR along frequency axis, although the lined-up TE/TM peak frequency can be shifted by any frequency spacing depending on the phase offset change caused by a properly selected value of at least the added length $L_b$ of the birefringence waveguide.

Figure 4:
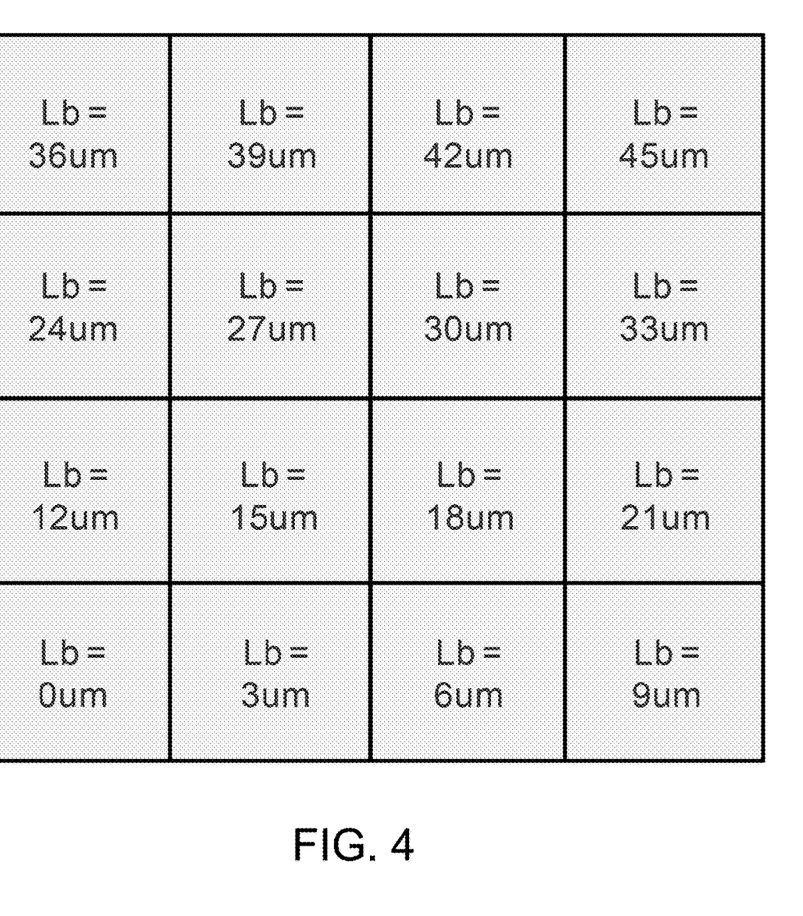
FIG. 4 shows an example of a stepper reticle map of multiple different lengths of birefringence waveguides respectively added for manufacturing a set of DLI devices with lined-up TE/TM passband peak frequencies to cover all channels of an entire spectral band according to an embodiment of the present invention.

FIG. 4 shows an example of a stepper reticle map of multiple different lengths of birefringence waveguides respectively added for manufacturing a set of DLI devices with lined-up TE/TM passband peak frequencies to cover all channels of an entire spectral band according to an embodiment of the present invention. This diagram is merely an example, which should not unduly limit the scope of the claims. One of ordinary skill in the art would recognize many variations, alternatives, and modifications. As pointed earlier, by changing the length of one birefringence waveguide of one arm relative to another, the TE/TM mode passband peaks can be adjusted to be lined up at different frequencies. In an example, a DLI device with two waveguide arms made silicon nitride material, which is a birefringence material with slightly different group indices $N_{TE}$~1.97 and $N_{TM}$~1.89 respectively for TE mode and TM mode of light waves of entire C-band frequencies. The birefringence effect induces an offset for TE mode period $FSR_{TE}$ relative to TM mode period $FSR_{TM}$ of the multi-maxima interference spectrum of the DLI device. The offset causes most TE passband peaks off from corresponding TM passband peaks while having just one or a few more TE/TM peaks lined up, for example, at f1 for the interference spectrum B1.

As the TE/TM offset increases with increasing length of one waveguide arm by adding a $L_b$ length of birefringence waveguide, for example waveguide 220 as seen in FIG. 2, originally lined-up TE/TM passband peaks will be no longer lined up to each other, for example at f1, while one or more other TE/TM passband peaks at higher frequencies, for example at f2>f1 as seen in FIG. 3, may be lined up depending on specific phase change caused by the value of added length $L_b$. Optionally, the birefringence waveguide is a silicon nitride planar wave guide. Alternatively, the birefringence waveguide is a silicon planar wave guide. Depending on the material used in the added waveguide and its birefringence effect, the total range and step size of the stepper reticle map can be properly defined to provide sufficient numbers of $L_b$ lengths for achieving polarization compensation for each and every channel of a designated grid in an entire operational spectral band.

Referring to FIG. 4, the stepper reticle map can be defined as a group of stepwise increased values from zero up to a maximum value with a predetermined increment. Theoretically, the maximum value of the stepper reticle map is selected for inducing a total phase shift of $2\pi$ for the interference spectrum of the delay line interferometer. The first non-zero value, which is equal to the increment value of the stepper reticle map, is determined to cause a minimum shift of the lined-up TE/TM passband peaks from at least one channel to a nearest channel of the same designated grid. Therefore, by selecting all values from the stepper reticle map for the added $L_b$ length of silicon nitride waveguide, a set of new DLI devices (200) can be formed by adding the selected $L_b$ length of silicon nitride waveguide to one arm of a base DLI device (100) to allow that each channel of the designated grid of a wide spectral band is aligned at least once by a lined-up TE/TM passband peaks. In this way, each channel of designed grid in the entire spectral band can be configured to be a polarization compensated channel for at least one of the set of new DLI devices (200).

For example, the DLI device 200 with silicon nitride waveguide, as the length $L_b$ of the added silicon nitride waveguide 220 increases up to 50 μm the phase change can be greater than $2\pi$ to cause the lined-up TE/TM passband peak frequency to shift from one channel to another across entire C-band. In other words, the added length $L_b$ can be limited just within 0-50 μm range to induce all required phase changes in a set of DLI devices (200) to cause different shifts of the lined-up TE/TM passband peak frequencies. Each of the set of the DLI devices (200) is configured to operate with TE/TM passband peaks being lined up or polarization self-compensated at one or more frequencies. In a specific embodiment, in case that the lined-up TE/TM passband peak may not fall into an exact channel frequency in a designated grid, a heater can be added to one of the two waveguide arms of the DLI device to provide a finer shift to align the polarization compensated frequency to exact channel frequency of the designated optical band. Optionally, a first heater can be installed over a partial section of the first waveguide arm (arm A) for tuning the frequency for channel alignment by thermal effect.

Referring to FIG. 4, multiple birefringence silicon nitride waveguides can be selected with different lengths of $L_b$ ranging from 0 μm to 45 μm arranged in a 4×4 reticle map. In the embodiment, the length $L_b$ is increased by 3 μm every step according to the 4×4 reticle map for making a set of DLI devices one after another with corresponding TE/TM polarization compensated working frequencies. In another specific embodiment, the length $L_b$ is increased k μm every step according to the n×n reticle map for making a set of DLI devices one after another with corresponding TE/TM polarization compensated working frequencies, where k is a number ranging from 0 to 3 μm and n is an integer to represent the size of the reticle field depending on the frequency band range in which each individual channels is TE/TM polarization self-compensated for at least one of the set of DLI devices. Alternatively, a second heater can be installed directly over the added length $L_b$ of the birefringence waveguide for provide additional thermal tuning of the TE or TM mode peak frequency. As silicon material has a polarization dependent group index with 2× higher thermal-sensitivity than that of silicon nitride material, the second heater is disposed over a silicon based birefringence waveguide of length $L_{b1}$ can be more effective to tune TE mode peak frequency than a same heater is disposed over a silicon nitride based birefringence waveguide of length $L_{b2}$. Accordingly, a smaller value of length $L_{b1}$ can be used to achieve same tuning effect as a larger value of length $L_{b2}$, this effectively reduces the size of the reticle map and increases production efficiency.

In an alternative embodiment, the phase shift can be introduced by adjusting waveguide width rather than merely by increasing length $L_b$ for the added birefringence waveguide. Depending on the material characteristics, the phase shift values obtained by changing waveguide width at different frequencies may be different and have a non-liner relationship versus width values. Therefore, defining a reticle map for selecting different stepper lengths of added birefringence waveguide is relatively easier than defining a reticle map based on different waveguide width, though it can be done in different way. Of course, there are other alternatives, variations and modifications.

Figure 5:
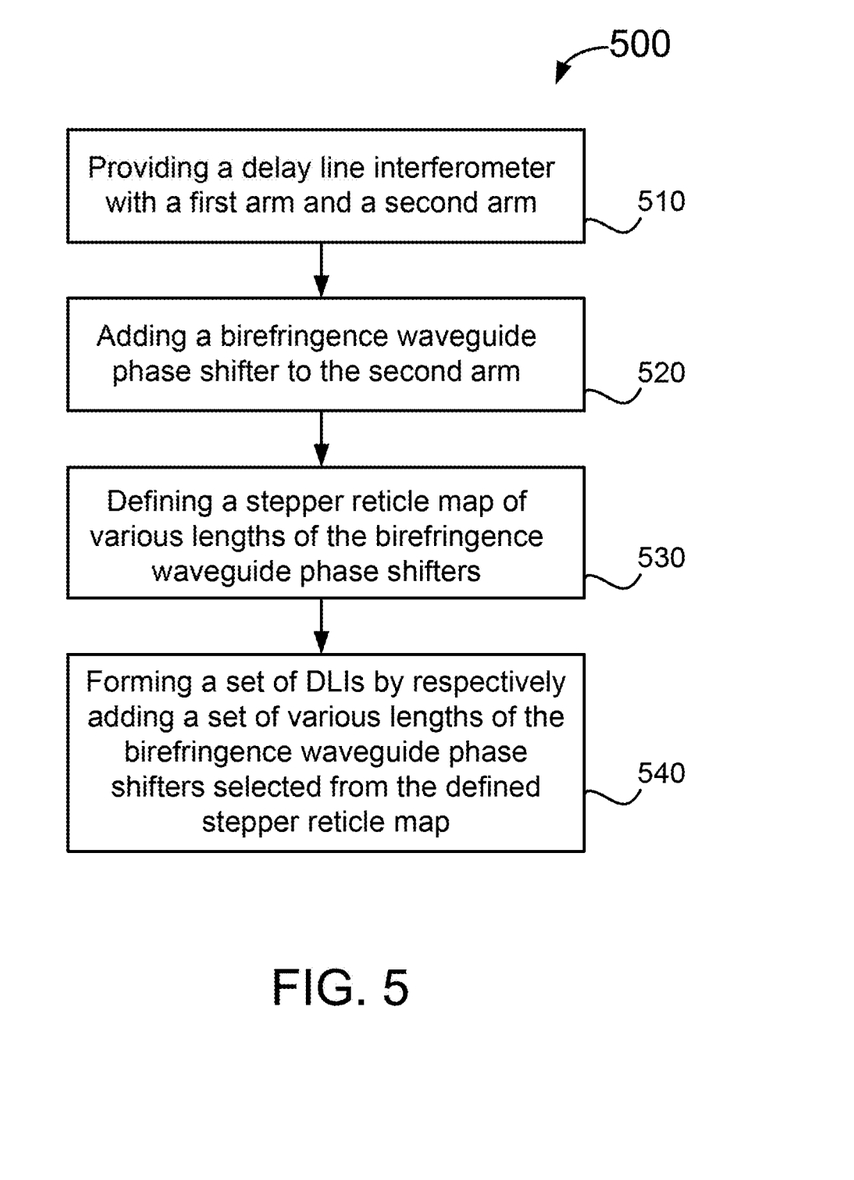
FIG. 5 is a flow chart showing a method for manufacturing a set of DLI devices respectively with polarization compensation at one or more frequencies to cover all channels in entire C-band according to an embodiment of the present invention.

FIG. 5 is a flow chart showing a method for manufacturing a set of DLI devices respectively with polarization compensation at one or more frequencies to cover all channels in entire C-band according to an embodiment of the present invention. This diagram is merely an example, which should not unduly limit the scope of the claims. One of ordinary skill in the art would recognize many variations, alternatives, and modifications. As shown, the method 500 includes a step 510 of providing a base delay line interferometer with a first arm and a second arm. For example, this delay line interferometer can be the DLI device 100 as shown in FIG. 1. In a specific embodiment, the base DLI device has an intrinsic birefringence effect so that most TE mode passband peaks of the operational interference spectrum are off from corresponding TM mode passband peaks except a few lined-up TE/TM peaks at certain frequencies across a wide operational band, e.g., C-band.

In an embodiment, the method 500 further includes a step 520 of adding a birefringence phase shifter to the second arm of the base DLI device. The added birefringence waveguide phase shifter can be a length of waveguide merged into the waveguide arm of the DLI device. For example, the added birefringence waveguide phase shifter is a length $L_b$ of birefringence waveguide 220 having different group indices for TE mode and TM mode as shown in FIG. 2 to form the modified DLI device, e.g., the DLI device 200 of FIG. 2. Accordingly, the added birefringence waveguide phase shifter causes different phase shifts, $L_b/V_{TE}$ vs. $L_b/V_{TM}$, for TE mode and for TM mode, resulting in a shift in those lined-up TE/TM passband peaks in frequency axis.

In the embodiment, the method 500 further includes a step 530 of defining a stepper reticle map of various lengths of the birefringence waveguide phase shifters based on the waveguide material and width (assume a rectangular shape and a fixed height same as the waveguide of the second arm of the DLI device) as well as a particular operational band. In a specific embodiment, the step 530 includes determining a maximum length value in the reticle map which corresponds to full period of $2\pi$ phase shift. This provides a sufficient range of the reticle map to achieve all the necessary shifts of the lined-up TE/TM passband peaks because the DLI interference spectrum includes multiple passbands with a period of FSR. Additionally, the step 530 includes determining a step size of the length variation over entire stepper reticle map so that the shifts of the lined-up TE/TM passband peaks in all set of DLI devices made with added various lengths of birefringence waveguide selected from the reticle map will cover each individual channel in a frequency grid of a particular operational band. For example, as shown in FIG. 4, a step size of 3 μm is chosen for a silicon nitride waveguide and 0.7 μm waveguide width for operation in C-band.

Finally, the method 500 includes a step 540 of forming a set of DLI devices by adding a set of various lengths of birefringence waveguides respectively selected from the defined reticle map. As long as the stepper reticle map is properly defined, each of the set of DLI devices is able to achieve polarization compensation with lined-up TE/TM passband peaks on one or more frequencies. In a specific embodiment, forming each DLI device includes adding a heater to one waveguide arm for fine tuning the passband frequencies to ensure they are aligned to particular frequency grid of a designated operational band, for example, the C-band. In another specific embodiment, as the size of the total reticle field is properly determined, the full set of DLI devices, each having one or more polarization compensated passband channels aligned in particular frequency grid, can have all channels of the designated operational band to be polarization compensated. This is very much beneficial for making a full spectrum polarization independent MUX/DEMUX module based on silicon photonics platform.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A delay line interferometer comprising:
   a first waveguide arm;
   a second waveguide arm being different from the first waveguide arm by a first length; and
   a birefringence waveguide section of a second length inserted in the second waveguide arm; wherein the second length is varied stepwise with a predetermined increment to induce sufficient number of phase shifts of an interference output spectrum with a number of passband peaks for TE (transverse electric) polarization mode and TM (transverse magnetic) polarization mode being respectively lined up with the same number of channels of a designated optical band,
   wherein the first waveguide arm comprises a material selected from silicon nitride and silicon nitride mixed with silicon oxide.

2. The delay line interferometer of claim 1 wherein the first waveguide arm and the second waveguide arm comprise one or more planar waveguide sections having a same height formed on a same SOI substrate and isolated from each other by silicon oxide.

3. The delay line interferometer of claim 1 wherein the second waveguide arm comprises the same material as the first waveguide arm or an alternative selection of silicon, silicon nitride, and silicon nitride mixed with silicon oxide.

4. The delay line interferometer of claim 1 wherein the birefringence waveguide section comprises a material selected from silicon and silicon nitride.

5. The delay line interferometer of claim 4 wherein the birefringence waveguide section comprises the same height as a planar waveguide section of the second waveguide arm but a wider waveguide width than the second waveguide arm for providing additional phase shift beyond length delay for TE mode and TM mode that is tuned in stepwise manner to cover alternative channels of a DWDM/CWDM band.

6. The delay line interferometer of claim 5 further comprising a width-adaptive taper for coupling the birefringence waveguide section to the planar waveguide section of the second waveguide arm.

7. The delay line interferometer of claim 1 wherein the second length comprises a fixed set of values stepwise increased to define a stepper reticle field, wherein each value is able to induce at least one phase shift to line one or more passband peaks up with one or more channels of the designated optical band.

8. The delay line interferometer of claim 1 further comprising a heater over at least a partial section of either the first waveguide arm or the second waveguide arm to change temperature locally to introduce an additional phase delay to ensure that the one or more passband peaks lined-up for TE mode and TM mode are accurately aligned to one or more corresponding channel frequencies of the designated optical band.

9. The delay line interferometer of claim 5, wherein the delay line interferometer is configured to be a polarization self-compensated de-multiplexer covering at least two DWDM/CWDM channels in entire C-band.

10. A method for forming a set of polarization self-compensated delay line interferometers, the method comprising:
    forming a first waveguide arm of a first length by a material selected from silicon nitride and silicon nitride mixed with silicon oxide;
    forming a second waveguide arm of a second length with a same material as the first waveguide arm, wherein the second length is at least different from the first length to induce an interference output spectrum having one or more passband peaks lined up with TE (transverse electric) polarization mode and TM (transverse magnetic) polarization mode at one or more channel frequencies of a designated optical band;
    selecting a birefringence phase shifter of a third length based on a value deduced from a fixed set of values of a stepper reticle field, the fixed set of values being stepwise increased from a first non-zero value up to a maximum value with a predetermined increment; and
    varying the third length of the birefringence phase shifter based on a predetermined set of values of the stepper reticle field to obtain a set of delay line interferometers.

11. The method of claim 10 wherein providing a first delay line interferometer comprises forming the first waveguide arm and the second waveguide arm on a common SOI substrate and isolating each other by an insulator cladding material made by silicon oxide.

12. The method of claim 10 wherein the birefringence phase shifter comprises a waveguide section of the third length made by silicon or silicon nitride.

13. The method of claim 12 wherein the waveguide section of the third length comprises a planar waveguide having a same height as the second waveguide arm but a wider waveguide width than the second waveguide arm for providing additional phase shift beyond length delay for TE mode and TM mode.

14. The method of claim 13 further comprising using a width-adaptive taper to couple the waveguide section of the third length to the second waveguide arm.

15. The method of claim 10 wherein the maximum value corresponds to a phase shift up to $2\pi$ determined by difference between a TE polarization mode group index and a TM polarization mode group index of the birefringence phase shifter, the stepper reticle field being a stepper reticle table for making a set of delay line interferometers.

16. The method of claim 10 wherein the first non-zero value equals to the predetermined increment corresponding to a minimum phase shift to cause at least one passband peak lined-up for TE and TM modes to shift from one channel frequency to a nearest channel frequency of the designated optical band.

17. The method of claim 10 wherein the selecting a birefringence phase shifter comprises making each of the set of delay line interferometers to be a polarization self-compensated de-multiplexer to cover at least two channels of the designated optical band.

18. The method of claim 17 wherein the selecting a birefringence phase shifter comprises configuring the set of delay line interferometers to cover all channels in the designated optical band.

19. The method of claim 18 wherein the designated optical band comprises C-band with all frequency channels defined according ITU standard.

20. The method of claim 10 further comprising disposing a heater over at least a partial section of the either the first waveguide arm or the second waveguide arm to change temperature locally to introduce an additional phase delay to ensure that the one or more passband peaks lined-up for TE mode and TM mode are accurately aligned to corresponding one or more channel frequencies of the designated optical band.

* * * * *